United States Patent
Mallik et al.

(10) Patent No.: US 10,581,568 B2
(45) Date of Patent: Mar. 3, 2020

(54) NETWORK DISCOVERY AND SYNCHRONIZATION FOR NR-SS

(71) Applicant: QUALCOMM Incorporated, San Diego, CA (US)

(72) Inventors: Siddhartha Mallik, San Diego, CA (US); Xiaoxia Zhang, San Diego, CA (US); Taesang Yoo, Riverside, CA (US); Aleksandar Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/637,555

(22) Filed: Jun. 29, 2017

(65) Prior Publication Data

US 2018/0139018 A1     May 17, 2018

Related U.S. Application Data

(60) Provisional application No. 62/421,114, filed on Nov. 11, 2016.

(51) Int. Cl.
*H04W 56/00*     (2009.01)
*H04L 5/00*     (2006.01)
(Continued)

(52) U.S. Cl.
CPC .......... *H04L 5/0035* (2013.01); *H04J 3/0602* (2013.01); *H04L 5/0078* (2013.01);
(Continued)

(58) Field of Classification Search
CPC .................................................. H04W 56/001
See application file for complete search history.

(56) References Cited

U.S. PATENT DOCUMENTS

| | | |
|---|---|---|
| 8,116,793 B2 | 2/2012 | Kwon et al. |
| 2012/0320790 A1 | 12/2012 | Shaffer et al. |

(Continued)

FOREIGN PATENT DOCUMENTS

| | | | |
|---|---|---|---|
| WO | WO 2012/112126 A1 * | 8/2012 | ............ H04W 48/16 |
| WO | WO-2015077747 A2 | 5/2015 | |
| WO | WO-2016036219 A1 | 3/2016 | |
| WO | WO-2016074741 A1 | 5/2016 | |

OTHER PUBLICATIONS

<Span style="font-family: calibri;">< p style="margin: 0in 0in 10pt;"><span style="font-size: 16px;">3GPP: "Synchronisation of Node B's in TDD via Selected PRACH Time Slots", Siemens AG, TDoc TSG RAN WG1 (99)G42, 3GPP TSG-RAN Working Group 1, Meeting ™8, New York, USA, Oct. 12-15, 1999, pp. 1-4.
International Search Report and Written Opinion—PCT/US2017/058450—ISA/EPO—dated Jan. 11, 2018.

*Primary Examiner* — Hoon J Chung
(74) *Attorney, Agent, or Firm* — Liem T. Do

(57) ABSTRACT

Network discovery and synchronization for new radio (NR) shared spectrum (NR-SS) is discussed for a wireless network having a super frame configuration on a shared spectrum shared between a plurality of network operators. A base station may obtain a discovery preamble from a plurality of network entities within the wireless network, wherein each of the plurality of network entities belongs to one or more of the plurality of network operators and shares the super frame configuration. The base station detects the timing of the super frame configuration using the discovery preamble and may then synchronize the base station to the super frame configuration according to the detected timing.

30 Claims, 9 Drawing Sheets

(51) Int. Cl.
*H04J 3/06* (2006.01)
*H04L 29/08* (2006.01)
*H04W 8/00* (2009.01)
*H04W 28/18* (2009.01)
*H04W 40/24* (2009.01)
*H04W 48/16* (2009.01)
*H04W 74/08* (2009.01)
*H04W 16/14* (2009.01)

(52) U.S. Cl.
CPC ............ *H04L 67/04* (2013.01); *H04W 8/005* (2013.01); *H04W 28/18* (2013.01); *H04W 40/244* (2013.01); *H04W 48/16* (2013.01); *H04W 56/001* (2013.01); *H04W 16/14* (2013.01); *H04W 74/0808* (2013.01)

(56) References Cited

U.S. PATENT DOCUMENTS

| | | | |
|---|---|---|---|
| 2013/0322293 A1* | 12/2013 | Kang | H04W 48/16 370/254 |
| 2015/0103784 A1* | 4/2015 | Lorca Hernando | H04L 5/0032 370/329 |
| 2015/0148053 A1* | 5/2015 | Patel | H04W 72/0426 455/452.1 |
| 2015/0163760 A1 | 6/2015 | Wu et al. | |
| 2015/0264699 A1 | 9/2015 | Fwu et al. | |
| 2016/0212625 A1 | 7/2016 | Damnjanovic et al. | |
| 2017/0289936 A1 | 10/2017 | Chae et al. | |

* cited by examiner

NETWORK DISCOVERY AND SYNCHRONIZATION FOR NR-SS

CROSS-REFERENCE TO RELATED APPLICATIONS

This application claims the benefit of U.S. Provisional Patent Application No. 62/421,114, entitled, "NETWORK DISCOVERY AND SYNCHRONIZATION FOR NR-SS," filed on Nov. 11, 2016, which is expressly incorporated by reference herein in its entirety.

BACKGROUND

Field

Aspects of the present disclosure relate generally to wireless communication systems, and more particularly, to network discovery and synchronization for new radio (NR) shared spectrum (NR-SS).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (FDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication in a wireless network having a super frame configuration on a shared spectrum shared between a plurality of network operators includes obtaining, by a base station, a discovery preamble from a plurality of network entities within the wireless network, wherein each of the plurality of network entities belongs to one or more of the plurality of network operators and shares the super frame configuration, detecting a timing of the super frame configuration using the discovery preamble, and synchronizing the base station to the super frame configuration according to the detected timing.

In an additional aspect of the disclosure, an apparatus configured for wireless communication in a wireless network having a super frame configuration on a shared spectrum shared between a plurality of network operators includes means for obtaining, by a base station, a discovery preamble from a plurality of network entities within the wireless network, wherein each of the plurality of network entities belongs to one or more of the plurality of network operators and shares the super frame configuration, means for detecting a timing of the super frame configuration using the discovery preamble, and means for synchronizing the base station to the super frame configuration according to the detected timing.

In an additional aspect of the disclosure, a non-transitory computer-readable medium having program code recorded thereon for wireless communication in a wireless network having a super frame configuration on a shared spectrum shared between a plurality of network operators. The program code further includes code to obtain, by a base station, a discovery preamble from a plurality of network entities within the wireless network, wherein each of the plurality of network entities belongs to one or more of the plurality of network operators and shares the super frame configuration, code to detect a timing of the super frame configuration using the discovery preamble, and code to synchronize the base station to the super frame configuration according to the detected timing.

In an additional aspect of the disclosure, an apparatus configured for wireless communication in a wireless network having a super frame configuration on a shared spectrum shared between a plurality of network operators is disclosed. The apparatus includes at least one processor, and a memory coupled to the processor. The processor is configured to obtain, by a base station, a discovery preamble from a plurality of network entities within the wireless network, wherein each of the plurality of network entities belongs to one or more of the plurality of network operators and shares the super frame configuration, to detect a timing of the super frame configuration using the discovery preamble, and to synchronize the base station to the super frame configuration according to the detected timing.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
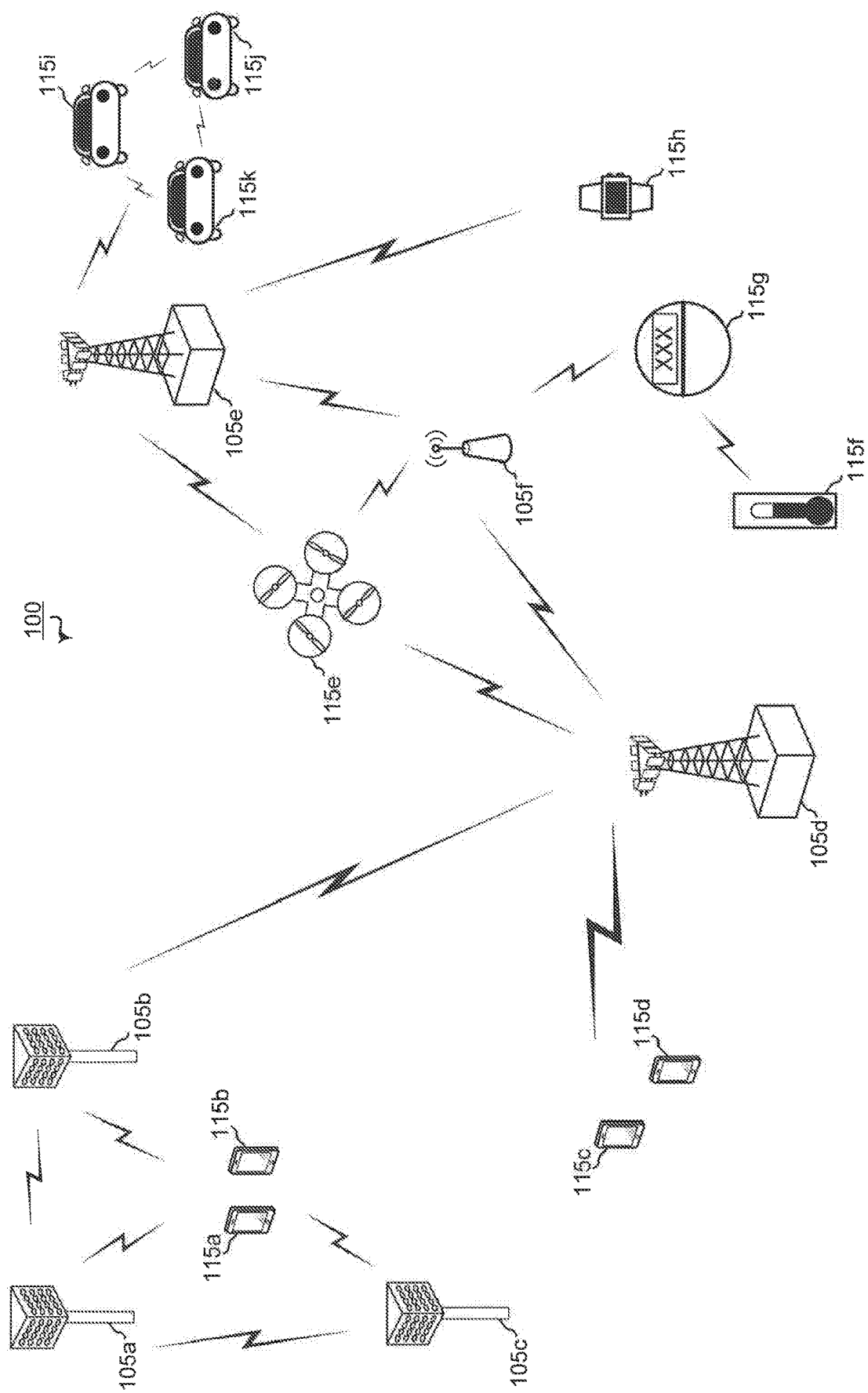
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2.). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications System (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5 G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, anchor as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of evolved node Bs (eNBs) 105 and other network entities. An eNB may be a station that communicates with the UEs and may also be referred to as a base station, a an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105*d* and 105*e* are regular macro eNBs, while eNBs 105*a*-105*c* are macro eNBs enabled with one of 3 dimension (3D), full dimension (FD), or massive MIMO. eNBs 105*a*-105*c* take advantage of their higher dimension MIMO capabilities to exploit 3D beamforming in both elevation and azimuth beamforming to increase coverage and capacity. eNB 105*f* is a small cell eNB which may be a home node or portable access point. An eNB may support one or multiple (e.g., two, three, four, and the like) cells.

The 5G network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115*a*-115*d* are examples of mobile smart phone-type devices accessing 5G network 100 A LIE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the eNBs, whether macro eNB, small cell, or the like. In FIG. 1, a lightning bolt (e.g., communication links) indicates wireless transmissions between a UE and a serving eNB, which is an eNB designated to serve the UE on the downlink and/or uplink, or desired transmission between eNBs, and backhaul transmissions between eNBs.

In operation at 5G network 100, eNBs 105*a*-105*c* serve UEs 115*a* and 115*b* using 3D beamforming and coordinated spatial techniques, such as coordinated multipoint (CoMP) or multi-connectivity. Macro eNB 105*d* performs backhaul communications with eNBs 105*a*-105*c*, as well as small cell, eNB 105*f*. Macro eNB 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115*e*, which is a drone. Redundant communication links with UE 115*e* include from macro eNBs 105*d* and 105*e*, as well as small cell eNB 105*f*. Other machine type devices, such as UE 115*f* (thermometer), UE 115*g* (smart meter), and UE 115*h* (wearable device) may communicate through 5G network 100 either directly with base stations, such as small cell eNB 105*f*, and macro eNB 105*e*, or in multi-hop configurations by communicating with another user device which relays its information to the network, such as UE 115*f* communicating temperature measurement information to the smart meter, UE 115*g*, which is then reported to the network through small cell eNB 105*f*. 5G network 100 may also provide additional network efficiency through dynamic, low-latency TDD/FDD communications, such as in a vehicle-to-vehicle (V2V) mesh network between UEs 115i-115k communicating with macro eNB 105e.

Figure 2:
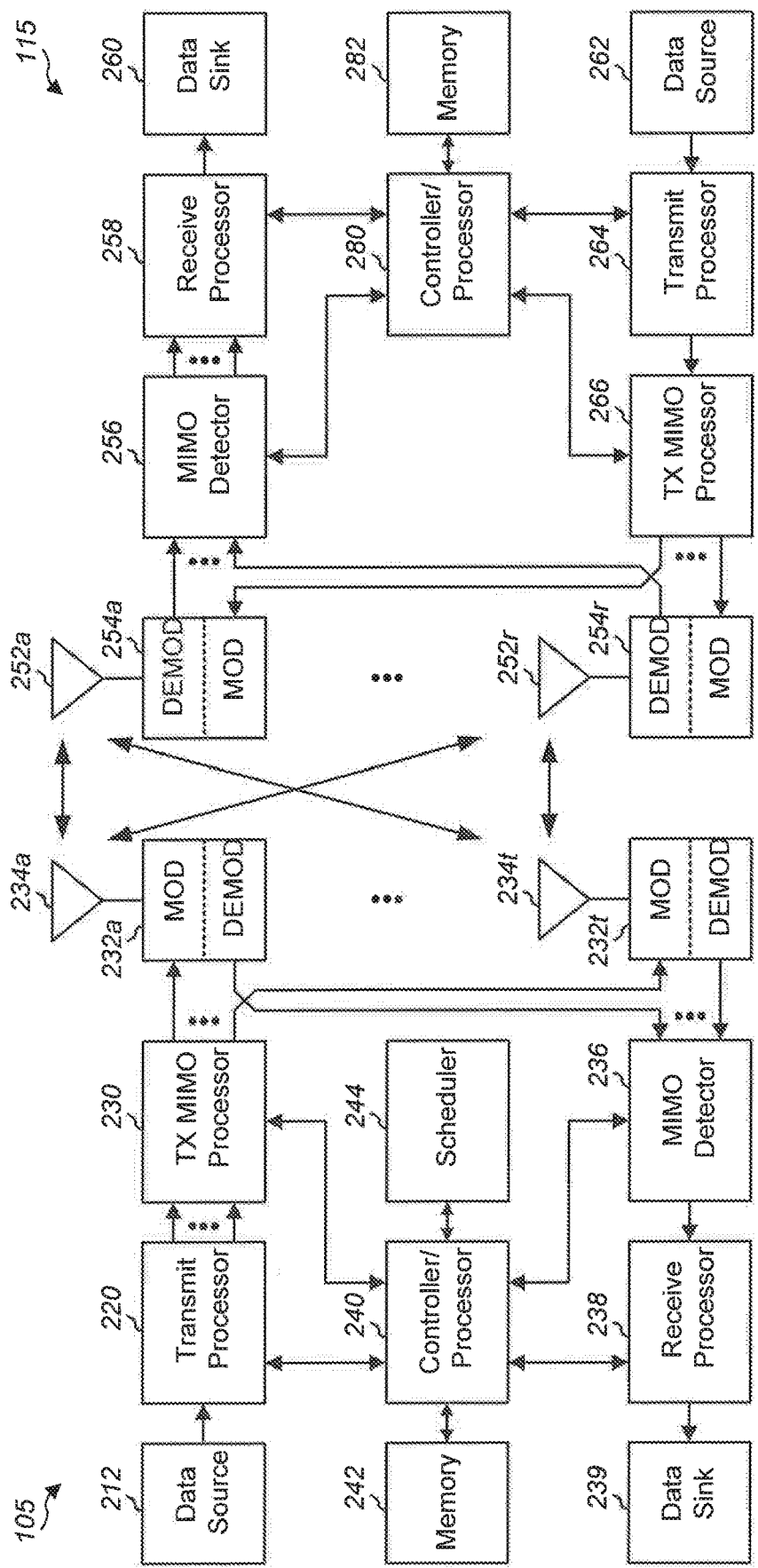
FIG. 2 is a block diagram illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. At the eNB 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to a controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the eNB 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
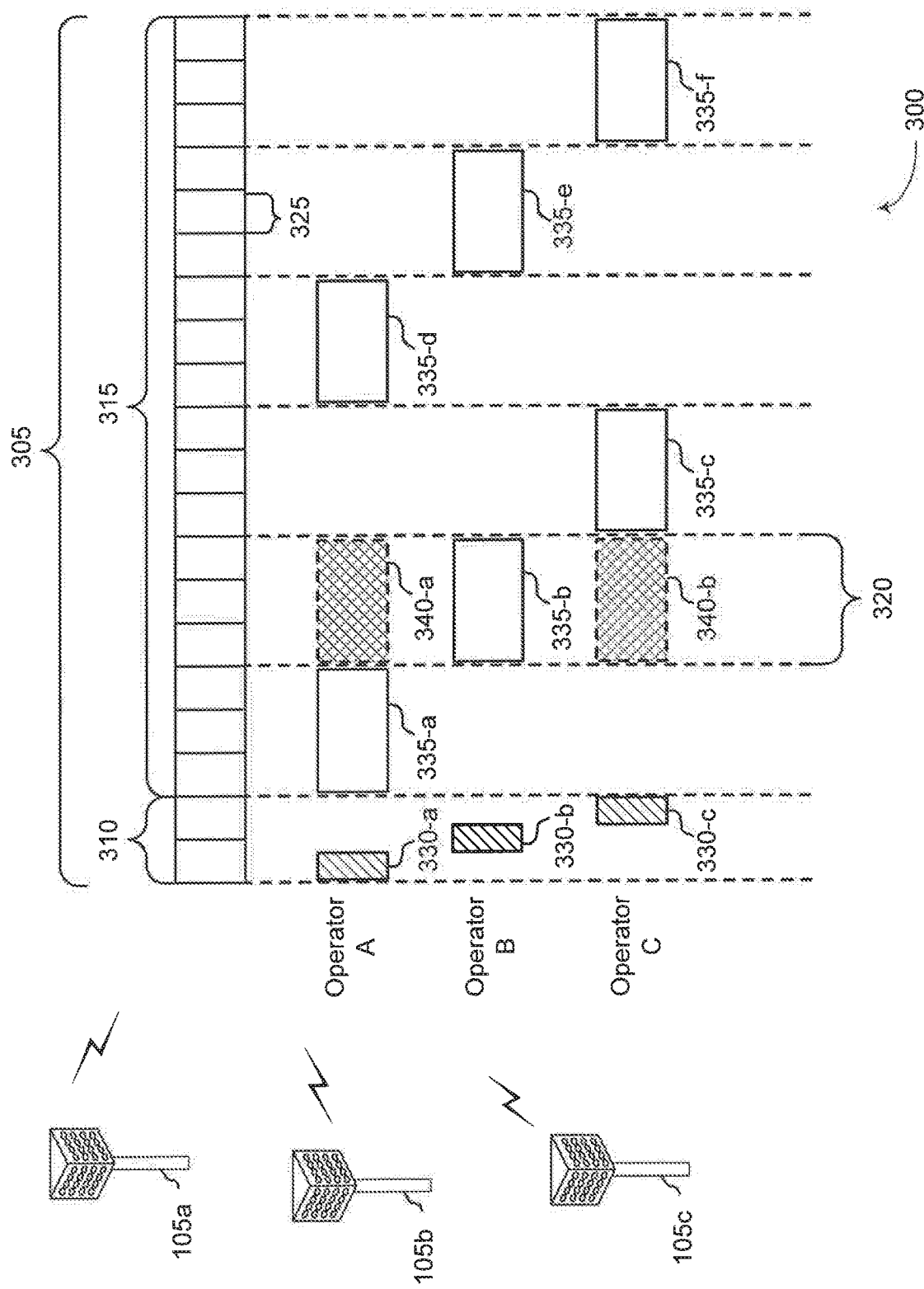
FIG. 3 illustrates an example of a timing diagram for coordinated resource partitioning.

FIG. 3 illustrates an example of a timing diagram 300 for coordinated resource partitioning. The timing diagram 300 includes a super frame 305, which may represent a fixed duration of time (e.g., 20 ms). Super frame 305 may be repeated for a given communication session and may be used by a wireless system such as 5G network 100 described with reference to FIG. 1. The super frame 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the super frame 305 may be further divided into a plurality of subframes 325 with a fixed duration (e.g., 1 ms). While timing diagram 300 illustrates three different network operating entities (e.g., Operator A, Operator B, Operator C), the number of network operating entities using the super frame 305 for coordinated communications may be greater than or fewer than the number illustrated in timing diagram 300.

The A-INT 310 may be a dedicated interval of the super frame 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the super frame 305. This partitioning of data may be an example of time division multiplexing (TDM). Also, when resources appear in the same sub-interval (e.g., resources 340-*a* and resources 335-*b*), these resources represent the same time resources with respect to the super frame 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling, may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within super frame 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-/INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of super frame 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

NR is the new radio technology for 5G that targets wider bandwidth, lower latency and overall better system performance. The NR design allows for deployment in unlicensed and shared spectrum (NR-SS). The super frame structure, as described and illustrated in FIG. 3, has also been proposed for use with NR-SS. The super frames can be aligned among all operators or super frames from different operators may be staggered. Both aligned and staggered super frame structures involve network synchronization within the cyclic prefix (CP) level. Synchronization may be achieved via global positioning system (GPS) signals, via network listen (by eNBs overhearing each other), or via UE assistance.

Figure 4:
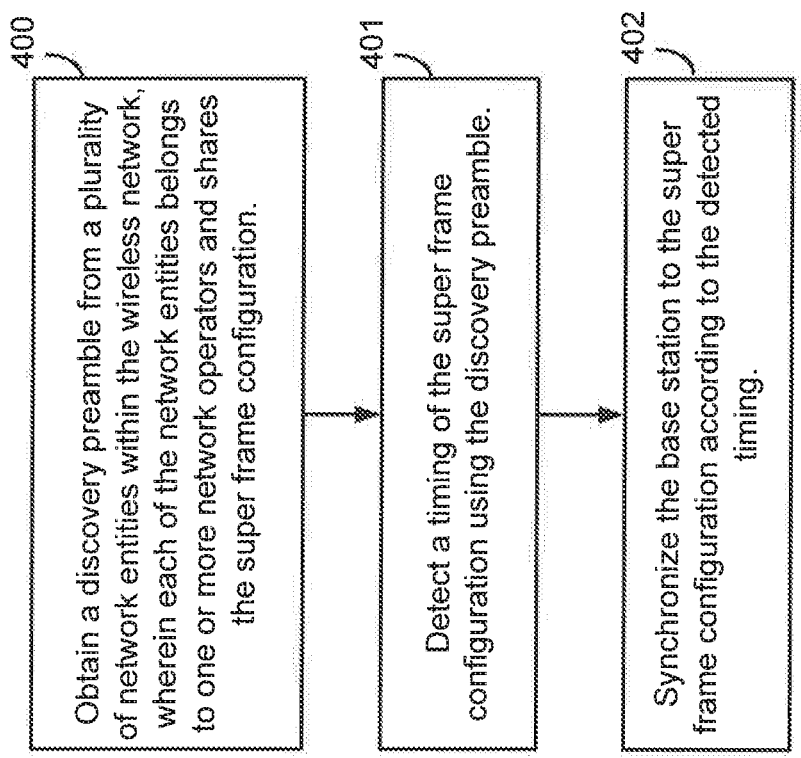
FIG. 4 is a block diagram illustrating example blocks executed to implement one aspect of the present disclosure.

FIG. 4 is a block diagram illustrating example blocks executed to implement one aspect of the present disclosure. At block 400, a base station obtains a discovery preamble from a plurality of network entities within the wireless network, wherein each of the network entities belongs to one or more network operators and shares the super frame configuration. The base station may receive the discovery preamble from any number of different network entities, including other base stations and UEs within the network. Various aspects of the present disclosure are directed to achieving synchronization via a discovery preamble transmitted in downlink signals. The discovery preamble may be transmitted at regular intervals by active eNBs with data for transmission that are already synchronous to one another. The discovery preamble may also be transmitted at the beginning of a super frame.

At block 401, the base station detects a timing of the super frame configuration using the discovery preamble. The discovery preamble may be an operator-specific sequence that is transmitted in a single frequency network (SFN) manner by all eNBs of the operator. Alternatively, the discovery preamble may be a globally known sequence, common to all operators, that is transmitted in an SFN manner by all eNBs of all operators. An eNB configured to join the network would synchronize itself by detecting the existing super frame timing via the discovery preamble. At block 402, the base station synchronizes to the super frame configuration according to the detected timing.

Figure 5:
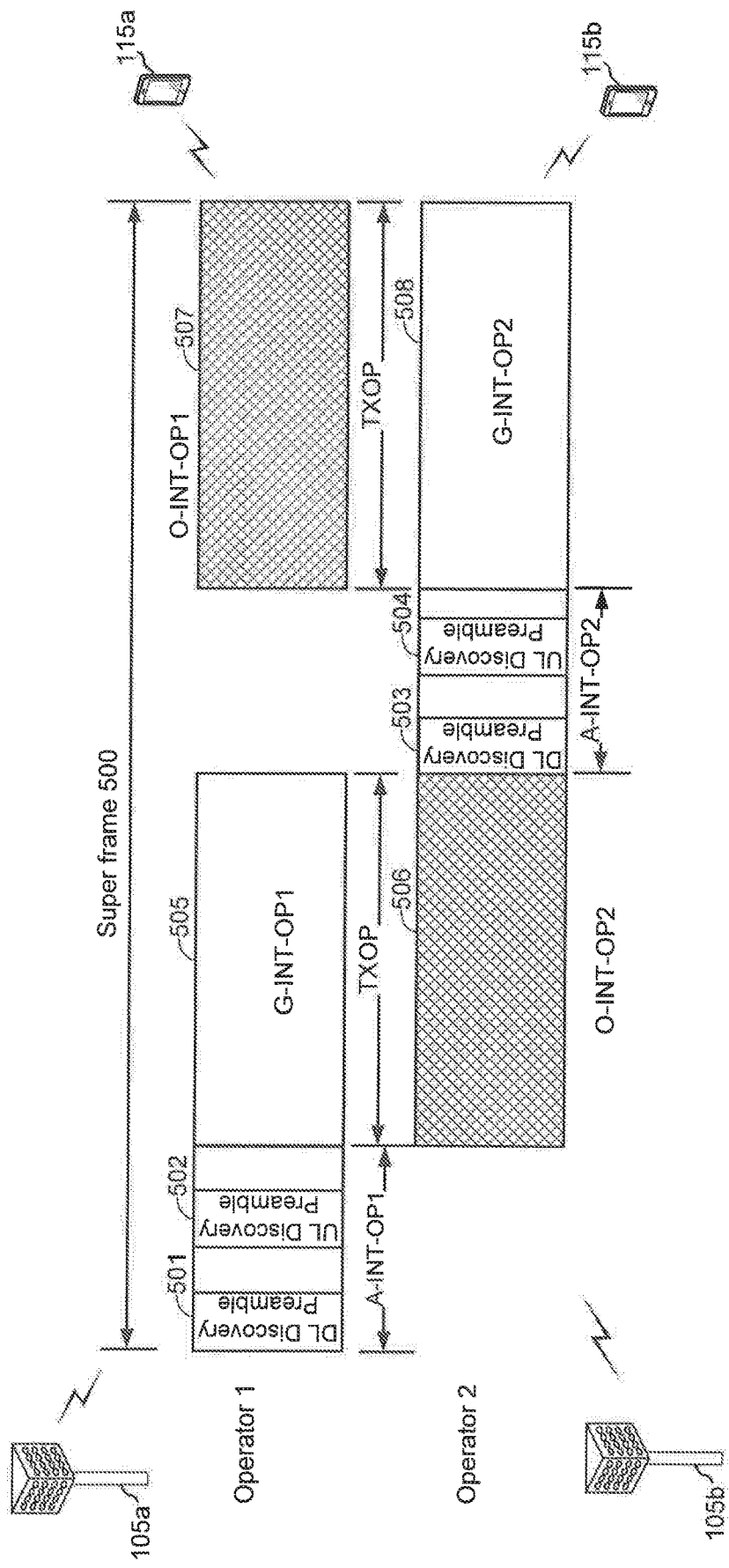
FIG. 5 is a block diagram illustrating eNBs and UEs configured according to one aspect of the present disclosure.

FIG. 5 is a block diagram illustrating eNBs 105a and 105b and UEs 115a and 115b configured according to one aspect of the present disclosure. eNB 105a and UE 115a belong to a first operator, Operator 1, in communications over super frame 500. The network area is shared with a second operator, Operator 2, that operates eNB 105b and UE 115b. The example illustrated in FIG. 5 shows an operator-specific discovery preamble transmission with staggered frame structure. Super frame 500 is staggered between Operator 1 and Operator 2. The discovery preambles that are transmittable by either or all of eNBs 105a and 105b and UEs 115a and 115b may be transmitted during each of the operators assigned A-INTs. For example, the network entities (e.g., eNB 105a and UE 115a) of Operator 1 may transmit downlink discovery preamble 501 and/or uplink discovery preamble 502 within A-INT-OP1 of Operator 1. The network entities (e.g., eNB 105b and UE 115b) of Operator 2 may transmit downlink discovery preamble 503 and/or uplink discovery preamble 504 within A-INT-OP2 of Operator 2. For the remainder of the arbitration interval of super frame 500 may be divided into guaranteed and opportunistic transmission intervals for Operators 1 and 2. For example, Operator 1 is assigned a guaranteed interval (G-INT-OP1) 505 and opportunistic interval (O-INT-OP1) 507, while Operator 2 is assigned O-INT-OP2 506 and G-INT-OP2 508.

Figure 6:
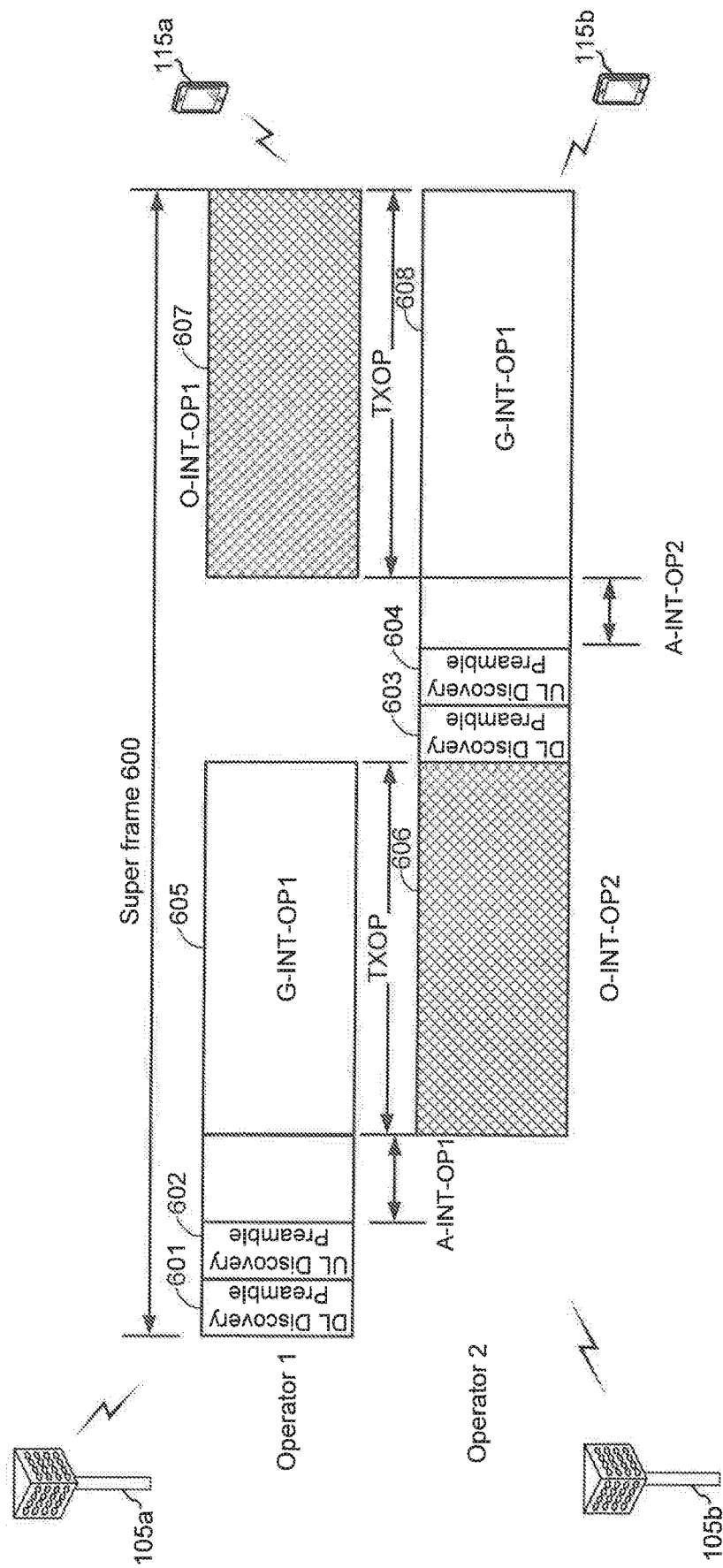
FIG. 6 is a block diagram illustrating eNBs and UEs configured according to one aspect of the present disclosure.

FIG. 6 is a block diagram illustrating eNBs 105a and 105b and UEs 115a and 115b configured according to one aspect of the present disclosure. eNB 105a and UE 115a belong to a first operator, Operator 1, in communications over super frame 600. The network area is shared with a second operator, Operator 2, that operates eNB 105b and UE 115b. The example illustrated in FIG. 6 shows an operator-specific discovery preamble transmission with staggered frame structure. Super frame 600 is staggered between Operator 1 and Operator 2. The discovery preambles that are transmittable by either or all of eNBs 105a and 105b and UEs 115a and 115b may be transmitted prior to each of the operators assigned A-INTs. For example, the network entities (e.g., eNB 105a and UE 115a) of Operator 1 may transmit downlink discovery preamble 601 and/or uplink discovery preamble 602 prior to A-INT-OP1 of Operator 1. The network entities (e.g., eNB 105b and UE 115b) of Operator 2 may transmit downlink discovery preamble 603 and/or uplink discovery preamble 604 prior to A-INT-OP2 of Operator 2. For the remainder of the arbitration interval of super frame 600 may be divided into guaranteed and opportunistic transmission intervals for Operators 1 and 2. For example, Operator 1 is assigned a G-INT-OP1 605 and O-INT-OP1 607, while Operator 2 is assigned O-INT-OP2 606 and G-INT-OP2 608.

Figure 7:
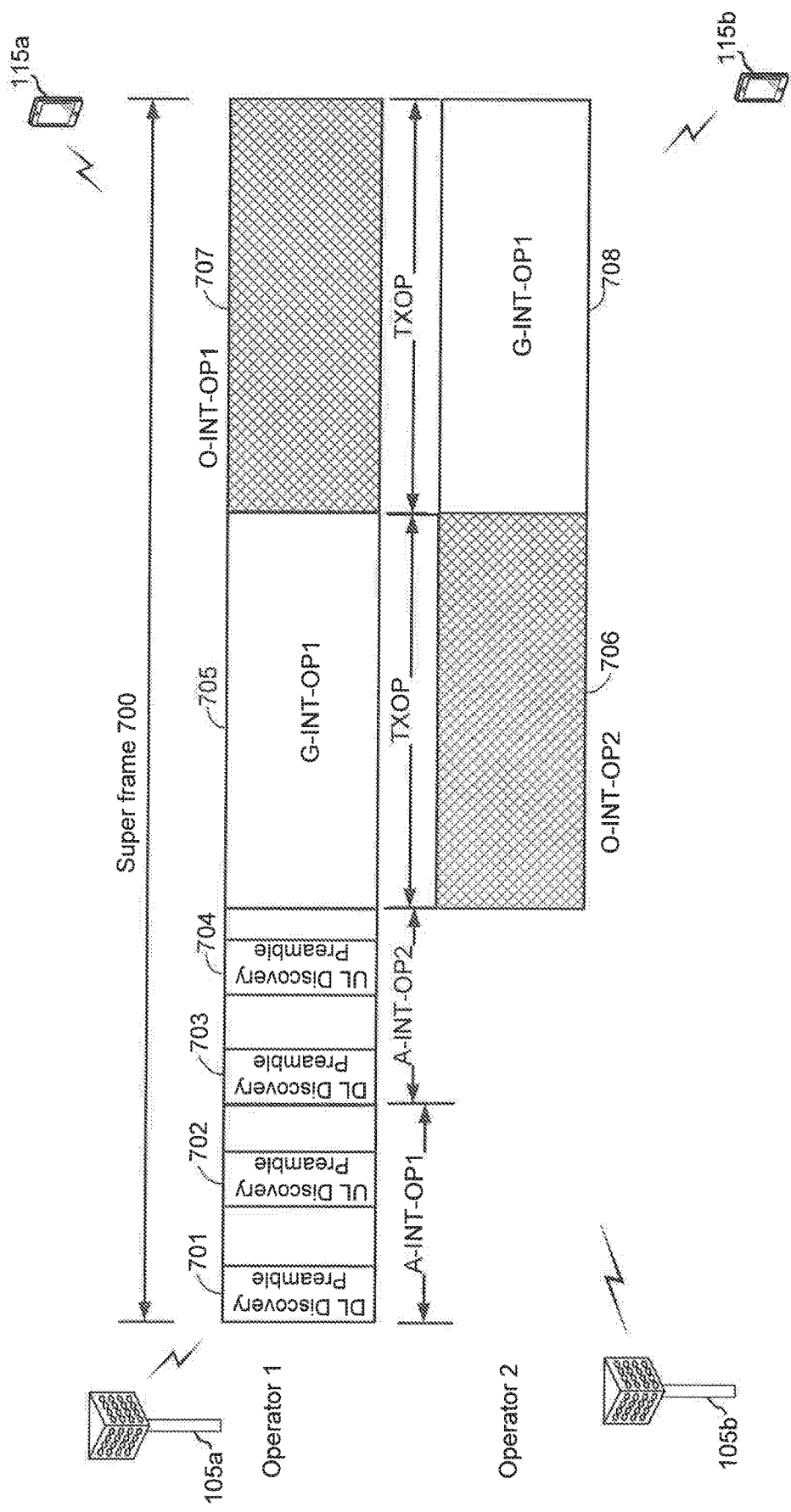
FIG. 7 is a block diagram illustrating eNBs and UEs configured according to one aspect of the present disclosure.

FIG. 7 is a block diagram illustrating eNBs 105a and 105b and UEs 115a and 115b configured according to one aspect of the present disclosure, eNB 105a and UE 115a belong to a first operator, Operator 1, in communications over super frame 700. The network area is shared with a second operator, Operator 2, that operates eNB 105b and UE 115b. The example illustrated in FIG. 7 shows an operator-specific discovery preamble transmission with aligned frame structure. Super frame 700 is aligned between Operator 1 and Operator 2. The discovery preambles that are transmittable by either or all of eNBs 105a and 105b and UEs 115a and 115b may be transmitted within each of the operators assigned A-INTs. For example, the network entities (e.g., eNB 105a and UE 115a) of Operator 1 may transmit downlink discovery preamble 701 and/or uplink discovery preamble 702 within A-INT-OP1 of Operator 1. The network entities (e.g., eNB 105b and UE 115b) of Operator 2 may transmit downlink discovery preamble 703 and/or uplink discovery preamble 704 within A-INT-OP2 of Operator 2. For the remainder of the arbitration interval of super frame 700 may be divided into guaranteed and opportunistic transmission intervals for Operators 1 and 2. For example, Operator 1 is assigned a G-INT-OP1 705 and O-INT-OP1 707, while Operator 2 is assigned O-INT-OP2 706 and G-INT-OP2 708.

Figure 8:
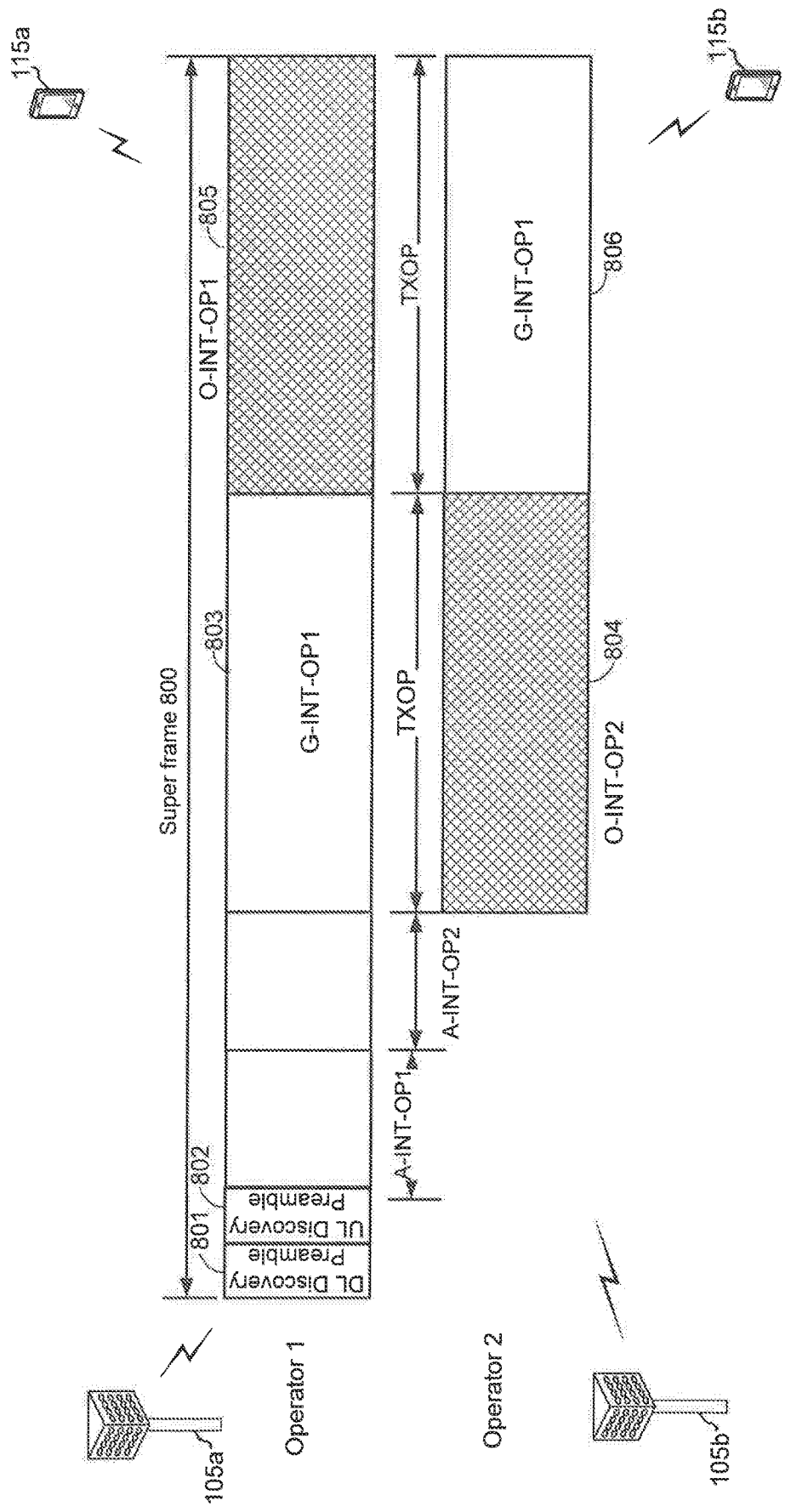
FIG. 8 is a block diagram illustrating eNBs and UEs configured according to one aspect of the present disclosure.

FIG. 8 is a block diagram illustrating eNBs 105a and 105b and UEs 115a and 115b configured according to one aspect of the present disclosure. eNB 105a and UE 115a belong to a first operator, Operator 1, in communications over super frame 800. The network area is shared with a second operator, Operator 2, that operates eNB 105b and UE 115b. The example illustrated in FIG. 8 shows an operator-specific discovery preamble transmission with an aligned frame structure. Super frame 800 is aligned between Operator 1 and Operator 2. The discovery preambles that are transmittable by either or all of eNBs 105a and 105b and UEs 115a and 115b may be transmitted prior to each of the operators assigned A-INTs. As illustrated in FIG. 8, the discovery preambles are common across all operators, thus, transmission of downlink discovery preamble 801 and uplink discovery preamble 802 include the timing sequence for all of the operators in the network (e.g., Operator 1 and Operator 2) Thus, downlink discovery preamble 801 and/or uplink discovery preamble 802 may be transmitted prior to A-INT-OP1 of Operator 1 and A-INT-OP2 of Operator 2. For the remainder of the arbitration interval of super frame 800 may be divided into guaranteed and opportunistic transmission intervals for Operators 1 and 2. For example, Operator 1 is assigned a G-INT-OP1 803 and O-INT-OP1 805, while Operator 2 is assigned O-INT-OP2 804 and G-INT-OP2 806.

Figure 9:
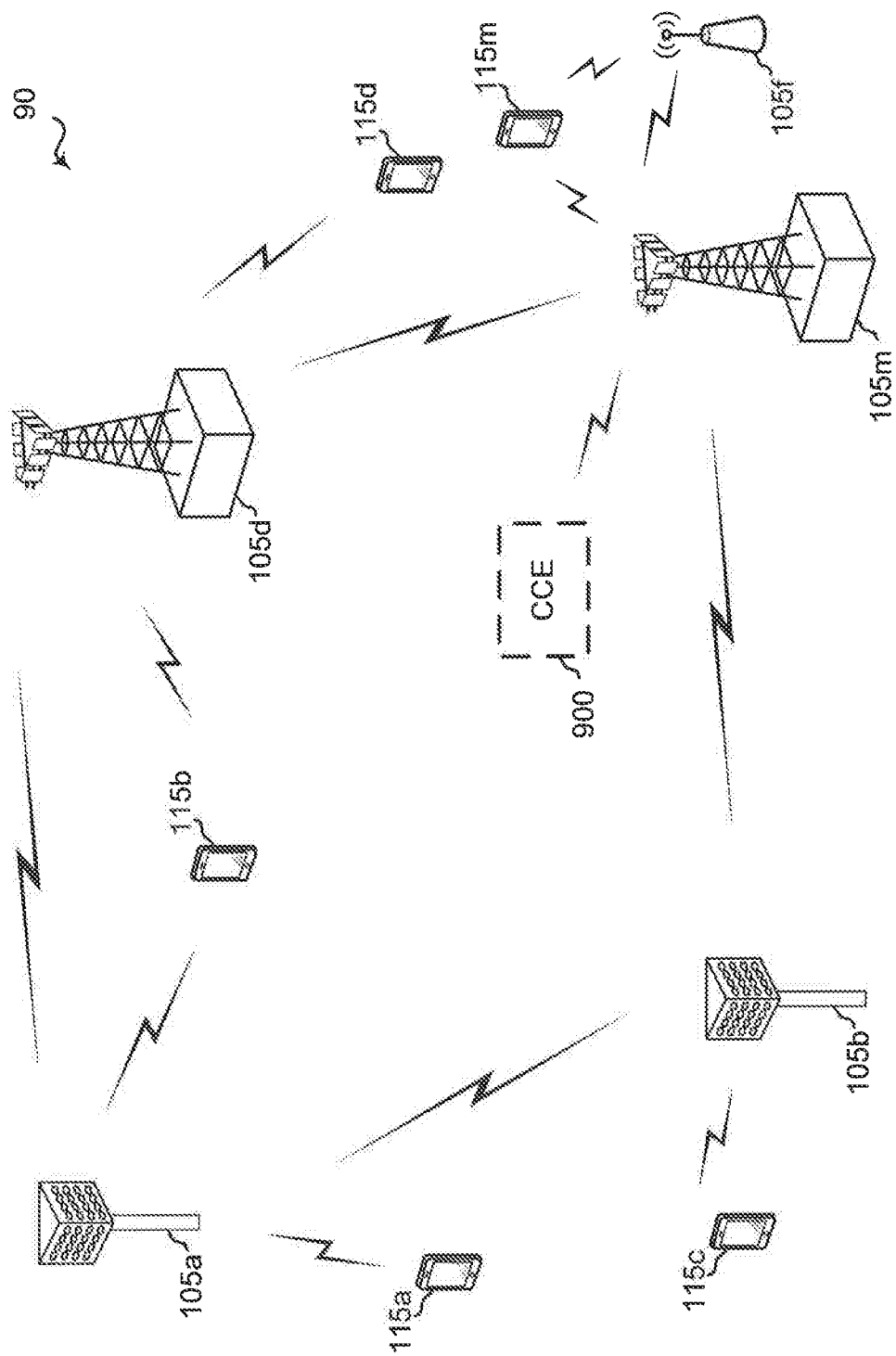
FIG. 9 is a block diagram illustrating a NR-SS network configured according to one aspect of the present disclosure.

FIG. 9 is a block diagram illustrating NR-SS network 90 configured according to one aspect of the present disclosure. The example scenario illustrated in FIG. 9 includes a new eNB 105m that may be configured to join NR-SS network 90. eNBs 105a and 105d and UEs 115a, 115b, and 115d each belong to a first operator, while eNB 105b and UE 115c belong to a second operator. If the discovery preamble sequence is operator-specific, new eNB 105m can directly acquire the super frame timing of the operator it belongs to by searching for the preamble sequence specific to its own operator. Thus, if eNB 105m were to belong to either the first or second operators, it may search for the specific preamble sequence assigned to the respective operator from the preambles transmitted by any of the network entities of its own network operator.

If, however, the discovery preamble sequence is common across all operators, new eNB 105*m* would acquire potentially multiple candidate super frame timings, one for each existing operator in the geographic region of NR-SS network 90. New eNB 105*m* would not yet know which of the acquired super frame timings is for its own operator. For each candidate super frame timing, new eNB 105*m* would determine if the super frame timing is of its own operator by acquiring the public land mobile network (PLMN) identifier (ID) present in master information block (MIB)/system information block 1 (SIB1).

In another example aspect illustrated in FIG. 9, if new eNB 105*m* that is configured to join the network is from a new operator, neither the first or second network operator, new eNB 105*m* would synchronize itself to NR-SS network 90 and allow the other operators (first and second operators) to become aware that a new operator is present and desires to secure its A-INT. New eNB 105*m* may, in some alternative aspects, obtain its A-INT location from a central coordinating entity (CCE) 900 (e.g. SAS, CXM (coexistence manager), etc.), if such an entity is present. New eNB 105*m* would register with the CCE 900 and subsequently obtain its secured A-INT location, When a central coordinating entity is not present in a given network, a distributed mechanism may be beneficial to obtain the A-INT location.

The aspect that provides for the distributed mechanism may also be described with respect to NR-SS network 90. When using a distributed mechanism for obtaining A-INT locations, all network entities from a given operator are not guaranteed to select the same A-INT location. To remedy this mismatch, additional aspects of the present disclosure provide for a procedure that allows the A-INT locations to converge. New eNB 105*m*, of a given operator detects an A-INT location of another eNB, eNB 105*f*, of the same operator distinct from its own A-INT location. New eNB 105*m* checks whether the A-INT location of eNB 105*f* is marked as permanent. If the A-INT location of eNB 105*f* is marked permanent, then eNB 105*m* will mark its own location as temporary. eNB 105*m* will confirm that the A-INT location of eNB 105*f* is still marked as permanent. If eNB 105*m* confirms that the A-INT location of eNB 105*f* is still marked as permanent, eNB 105*m* begins to transmit its discovery preamble at the A-INT location of eNB 105*f*, and marking it as permanent. eNB 105*f* will notify its own UEs, such as UE 115*m*, of the change in location of the A-INT and then ceases transmission of the discovery preamble in the old location.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc., digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication in a wireless network having a super frame configuration on a shared spectrum shared between a plurality of network operators, comprising:
    obtaining, by a base station, a discovery preamble from a plurality of network entities within the wireless network, wherein each of the plurality of network entities belongs to one or more of the plurality of network operators and shares the super frame configuration, and wherein network entities within the wireless network from which the discovery preamble is obtained are synchronous to each other prior to the obtaining;
    detecting a timing of the super frame configuration using the discovery preamble, wherein the detecting the timing includes detecting a sequence of the discovery preamble, wherein the sequence is common across the plurality of network operators or specific to each of the plurality of network operators; and
    synchronizing the base station to the super frame configuration according to the detected timing.

2. The method of claim 1, wherein the plurality of network entities includes two or more of:
    a user equipment (UE) from a same network operator as the base station;
    a UE from a different network operator as the base station;
    another base station from the same network operator; and
    another base station from a different network operator.

3. The method of claim 1, wherein the detecting the timing includes:
    identifying the sequence as associated with a same network operator as the base station; and
    obtaining the timing from the identified sequence.

4. The method of claim 1, wherein when the sequence is common across the plurality of network operators, the detecting the timing includes:
    identifying one or more network entities of the plurality of network entities from a same network operator as the base station based on a public land mobile network (PLMN) identifier obtained for each of the one or more network entities; and
    obtaining the timing from the sequence of the discovery preamble detected from the one or more network entities.

5. The method of claim 1, further including:
    obtaining an acquisition interval within the super frame for the base station, wherein the acquisition interval is associated with a network operator to which the base station belongs, and wherein the obtaining the acquisition interval includes one of:
        obtaining the acquisition interval from a central coordinating entity; or
        determining the acquisition interval by the base station.

6. The method of claim 5, further including determining the acquisition interval by the base station, wherein the determining the acquisition interval by the base station includes:
    determining at least one location within the super frame without a conflicting acquisition interval associated with another network operator different from the same network operator; and
    transmitting synchronization channels onto the acquisition interval.

7. The method of claim 6, further including:
    detecting another acquisition interval location of another base station of the same network operator, wherein the another acquisition interval location is different from the acquisition interval;
    determining that the another acquisition interval location is marked as permanent by the another base station;
    marking the acquisition interval of the base station as temporary;
    verifying, after the marking, that the another acquisition interval location is still marked as permanent;
    initiating transmission of a base station discovery preamble at the another acquisition interval location, wherein transmission of the base station discovery preamble is ceased at the acquisition interval; and
    notifying one or more served user equipments (UEs) of the another acquisition interval location.

8. The method of claim 1, further including:
    detecting synchronization channels on a location of the super frame from a neighboring base station belonging to a different network operator than the base station, wherein the location is outside of an acquisition interval associated with the base station; and
    refraining from opportunistically transmitting at the location in response to the detecting the synchronization channels.

9. The method of claim 8, wherein the detecting the synchronization channels on the location includes:
    receiving from a UE belonging to the same network operator a report identifying the synchronization channels on the location.

10. The method of claim 1, wherein obtaining, by the base station, the discovery preamble from the plurality of network entities within the wireless network includes receiving the discovery preamble from a user equipment (UE), and wherein the timing of the super frame indicates a timing of an acquisition interval, a guaranteed interval, an opportunity interval, an arbitration interval, or a combination thereof, of the super frame.

11. The method of claim 1, wherein the discovery preamble is within or prior to an acquisition interval (A-INT) of the super frame.

12. The method of claim 1, wherein the super frame includes acquisition intervals (A-INTs) and transmission opportunities (TXOPs), and wherein the super frame has an aligned frame structure or a staggered frame structure with respect to the A-INTs and the TXOPs.

13. The method of claim 1, further including:
   determining, by the base station, whether a first location of a first acquisition interval for the base station within the super frame is different from a second location of a second acquisition interval for a second based station of the plurality of network entities; and
   responsive to determining, by the base station, that the first location is different from the second location, marking the second location as permanent and the first location as temporary.

14. The method of claim 1, further including:
   determining, by the base station, a first acquisition interval within the super frame for the base station, wherein the acquisition interval is associated with a particular network operator to which the base station belongs and has a first location;
   detecting a second location of a second acquisition interval of another base station of the particular network operator, wherein the second location is different from the first location of the first acquisition interval;
   determining that the second location is marked as permanent by the another base station;
   marking the first location as temporary;
   verifying, after the marking, that the second location is still marked as permanent;
   initiating transmission of a base station discovery preamble at the second acquisition interval location, wherein transmission of the base station discovery preamble is ceased at the first location; and
   notifying one or more served user equipments (UEs) of the second location.

15. The method of claim 14, wherein the determining the first acquisition interval by the base station includes:
   determining at least one location within the super frame without a conflicting acquisition interval associated with another network operator different from the same network operator; and
   transmitting synchronization channels onto the first acquisition interval.

16. An apparatus configured for wireless communication in a wireless network having a super frame configuration on a shared spectrum shared between a plurality of network operating entities, comprising:
   means for obtaining, by a base station, a discovery preamble from a plurality of network entities within the wireless network, wherein each of the plurality of network entities belongs to one or more of the plurality of network operators and shares the super frame configuration, and wherein network entities within the wireless network from which the discovery preamble is obtained are synchronous to each other prior to the base station obtaining the discovery preamble;
   means for detecting a timing of the super frame configuration using the discovery preamble, wherein the means for detecting the timing includes means for detecting a sequence of the discovery preamble, wherein the sequence is common across the plurality of network operators or specific to each of the plurality of network operators; and
   means for synchronizing the base station to the super frame configuration according to the detected timing.

17. The apparatus of claim 16, wherein the plurality of network entities includes two or more of:
   a user equipment (UE) from a same network operator as the base station;
   a UE from a different network operator as the base station;
   another base station from the same network operator; and
   another base station from a different network operator.

18. The apparatus of claim 16, wherein the means for detecting the timing includes:
   means for identifying the sequence as associated with a same network operator as the base station; and
   means for obtaining the timing from the identified sequence.

19. The apparatus of claim 16, wherein when the sequence is common across the plurality of network operators, the means for detecting the timing includes:
   means for identifying one or more network entities of the plurality of network entities from a same network operator as the base station based on a public land mobile network (PLMN) identifier obtained for each of the one or more network entities; and
   means for obtaining the timing from the sequence of the discovery preamble detected from the one or more network entities.

20. The apparatus of claim 16, further including:
   means for obtaining an acquisition interval within the super frame for the base station, wherein the acquisition interval is associated with a network operator to which the base station belongs, and wherein the means for obtaining the acquisition interval includes one of:
      means for obtaining the acquisition interval from a central coordinating entity; or
      means for determining the acquisition interval by the base station.

21. A non-transitory computer-readable medium having program code recorded thereon configured for wireless communication in a wireless network having a super frame configuration on a shared spectrum shared between a plurality of network operating entities, the program code comprising:
   program code executable by a computer for causing the computer to obtain, by a base station, a discovery preamble from a plurality of network entities within the wireless network, wherein each of the plurality of network entities belongs to one or more of the plurality of network operators and shares the super frame configuration, and wherein network entities within the wireless network from which the discovery preamble is obtained are synchronous to each other prior to the base station obtaining the discovery preamble;
   program code executable by the computer for causing the computer to detect a timing of the super frame configuration using the discovery preamble, wherein the program code executable by the computer for causing the computer to detect the timing includes program code executable by the computer for causing the computer to detect a sequence of the discovery preamble, wherein the sequence is common across the plurality of network operators or specific to each of the plurality of network operators; and program code executable by the computer for causing the computer to synchronize the base station to the super frame configuration according to the detected timing.

22. The non-transitory computer-readable medium of claim 21, wherein the program code executable by the computer for causing the computer to detect the timing includes:
program code executable by the computer for causing the computer to identify the sequence as associated with a same network operator as the base station; and
program code executable by the computer for causing the computer to obtain the timing from the identified sequence.

23. The non-transitory computer-readable medium of claim 21, wherein when the sequence is common across the plurality of network operators, the program code executable by the computer for causing the computer to detect the timing includes:
program code executable by the computer for causing the computer to identify one or more network entities of the plurality of network entities from a same network operator as the base station based on a public land mobile network (PLMN) identifier obtained for each of the one or more network entities; and
program code executable by the computer for causing the computer to obtain the timing from the sequence of the discovery preamble detected from the one or more network entities.

24. The non-transitory computer-readable medium of claim 21, further including:
program code executable by the computer for causing the computer to obtain an acquisition interval within the super frame for the base station, wherein the acquisition interval is associated with a network operator to which the base station belongs, and wherein the program code executable by the computer for causing the computer to obtain the acquisition interval includes one of:
program code executable by the computer for causing the computer to obtain the acquisition interval from a central coordinating entity; or
program code executable by the computer for causing the computer to determine the acquisition interval by the base station.

25. An apparatus configured for wireless communication in a wireless network having a super frame configuration on a shared spectrum shared between a plurality of network operating entities, the apparatus comprising:
at least one processor; and
a memory coupled to the at least one processor,
wherein the at least one processor is configured:
to obtain, by a base station, a discovery preamble from a plurality of network entities within the wireless network, wherein each of the plurality of network entities belongs to one or more of the plurality of network operators and shares the super frame configuration, and wherein network entities within the wireless network from which the discovery preamble is obtained are synchronous to each other prior to the base station obtaining the discovery preamble;
to detect a timing of the super frame configuration using the discovery preamble, wherein the configuration of the at least one processor to detect the timing includes configuration of the at least one processor to detect a sequence of the discovery preamble, wherein the sequence is common across the plurality of network operators or specific to each of the plurality of network operators; and
to synchronize the base station to the super frame configuration according to the detected timing.

26. The apparatus of claim 25, wherein when the sequence is common across the plurality of network operators, the configuration of the at least one processor to detect the timing includes configuration of the at least one processor:
to identify one or more network entities of the plurality of network entities from a same network operator as the base station based on a public land mobile network (PLMN) identifier obtained for each of the one or more network entities; and
to obtain the timing from the sequence of the discovery preamble detected from the one or more network entities.

27. The apparatus of claim 25, further including configuration of the at least one processor:
to obtain an acquisition interval within the super frame for the base station, wherein the acquisition interval is associated with a network operator to which the base station belongs, and wherein the configuration of the at least one processor to obtain the acquisition interval includes configuration to one of:
obtain the acquisition interval from a central coordinating entity; or
determine the acquisition interval by the base station.

28. The apparatus of claim 27, wherein the at least one processor is configured to determine the acquisition interval by the base station, wherein the configuration of the at least one processor to determine the acquisition interval by the base station includes configuration of the at least one processor:
to determine at least one location within the super frame without a conflicting acquisition interval associated with another network operator different from the same network operator; and
to transmit synchronization channels onto the acquisition interval.

29. The apparatus of claim 28, further including configuration of the at least one processor:
to detect another acquisition interval location of another base station of the same network operator, wherein the another acquisition interval location is different from the acquisition interval;
to determine that the another acquisition interval location is marked as permanent by the another base station;
to mark the acquisition interval of the base station as temporary;
to verify, after the marking, that the another acquisition interval location is still marked as permanent;
to initiate transmission of a base station discovery preamble at the another acquisition interval location, wherein transmission of the base station discovery preamble is ceased at the acquisition interval; and
to notify one or more served user equipments (UEs) of the another acquisition interval location.

30. The apparatus of claim 25, further including configuration of the at least one processor:
to detect synchronization channels on a location of the super frame from a neighboring base station belonging to a different network operator than the base station, wherein the location is outside of an acquisition interval associated with the base station; and to refrain from opportunistically transmitting at the location in response to detecting the synchronization channels.

* * * * *